United States Patent [19]
Casimir et al.

[11] Patent Number: 4,653,617
[45] Date of Patent: Mar. 31, 1987

[54] VIBRATION DAMPER FOR VEHICLES

[75] Inventors: Manfred Casimir, Esslingen; Paul Graf, Koengen; Joachim Stumpf, Stuttgart, all of Fed. Rep. of Germany

[73] Assignee: Daimler-Benz Aktiengesellschaft, Fed. Rep. of Germany

[21] Appl. No.: 811,433

[22] Filed: Dec. 20, 1985

[30] Foreign Application Priority Data

Jan. 31, 1985 [DE] Fed. Rep. of Germany ....... 3503152

[51] Int. Cl.$^4$ ............................................... F16F 9/44
[52] U.S. Cl. .................................... 188/319; 137/906; 188/299; 188/322.13; 188/322.15; 280/714
[58] Field of Search ........... 188/285, 299, 319, 322.13, 188/322.14, 322.15; 267/127; 280/703, 714; 137/903, 906, 855, 857, 516.17, 528

[56] References Cited

U.S. PATENT DOCUMENTS

| 867,299 | 10/1907 | Pfluger | 137/906 X |
| 2,948,357 | 8/1960 | Cookson | 188/322.14 |
| 3,256,960 | 6/1966 | Casimir | 188/299 |
| 3,365,033 | 1/1968 | Willich | 188/319 |
| 3,621,951 | 11/1971 | Schmid . | |

FOREIGN PATENT DOCUMENTS

| 1505497 | 9/1969 | Fed. Rep. of Germany | 188/299 |
| 1505708 | 4/1974 | Fed. Rep. of Germany . | |
| 1817392 | 9/1975 | Fed. Rep. of Germany . | |
| 2359690 | 9/1983 | Fed. Rep. of Germany . | |
| 1382140 | 11/1964 | France . | |
| 1502350 | 11/1967 | France . | |
| 1207706 | 10/1970 | United Kingdom | 188/319 |

Primary Examiner—George E. A. Halvosa
Attorney, Agent, or Firm—Barnes & Thornburg

[57] ABSTRACT

A vibration damper for vehicles is described, the damper curve of which is required to be arbitrarily variable, to enable the damping to be adapted optimally to driving conditions. For this purpose, the invention has a vibration damper in which a regulating member actuable by an actuating device can be pressed with variable force against at least one spring washer of a valve closure element of a damping valve arranged in the damper piston. The contact pressure of the regulating member is arbitrarily variable and the regulating member can be pressed progressively against the spring washer of the valve closure element upon an increase of force in the radial direction.

16 Claims, 5 Drawing Figures

VIBRATION DAMPER FOR VEHICLES

BACKGROUND AND SUMMARY OF THE INVENTION

The invention relates to a vibration damper for vehicles.

Vibration dampers of this type are known (German Offenlegungsschrift No. 1,505,608; FIG. 1).

The regulating member assocated with the valve element of one piston damping valve is provided as an adjusting piston constructed as a stepped piston, which is guided by its circumferential part exhibiting the greater external diameter in a guide cylinder mounted on the piston rod of the vibration damper piston. Further, the regulating member abuts by its other circumferential part or piston part protruding out of the guide cylinder, against the spring washer of the valve element which exhibits the smallest diameter.

By means of the adjusting piston an auxiliary bracing force corresponding to the instantaneous load to be braced is transmitted to the damping valve, which is operative in the traction phase in this vibration damper. This causes the resilience of the spring washers to be correspondingly reduced and thereby increase the flow resistance of this damping valve by a corresponding amount.

This bracing force is generated as a function of the load. One cylinder chamber of the guide cylinder is connected through a connecting channel to another cylinder chamber which is connected to a pressure accumulator of the damper cylinder, and the adjusting piston is thereby stressed by a liquid pressure which is a function of the load.

One object of the invention is to disclose a vibration damper in which the flow resistance of the damping valve, which can be influenced by means of a regulating member, can be varied within wide limits arbitrarily, and thus independent from the pressure prevailing instantaneously in the cylinder chamber in which the valve element is present. This variation is provided to enable the damping to be adapted optimally to driving conditions.

This object is achieved by providing a vibration damper having a cylinder containing a flowable medium. A piston is slidably disposed in this cylinder and creates a first chamber and a second chamber in the cylinder. A piston rod is attached to the piston. A valve member comprising a flowable medium channel in the piston and a valve closure means is also provided. The channel opens into each chamber of the cylinder and the valve closure means covers at least one opening of the channel. The valve closure means exerts a force against the channel. An elastic regulating means is provided for regulating the valve closure force against the channel with a variable force independent of pressure conditions prevailing in the cylinder.

The invention therefore makes possible a planned variation of the valve closure pressure to be generated by the valve closure element, and therefore a desired variation of the characteristic of the vibration damper.

A desired higher damping force pattern of the damper curve is obtained by the operative association of the valve closure element and the regulating member. When the force is increased, the regulating member is progressively applied under pressure to spring washers of the valve closure element in a circumferential direction, and thereby correspondingly varies the resilience of the spring washers and/or hardens the valve closure element accordingly.

The arbitrary influence upon the flow resistance of the relevant damping valve may be exerted by steps or infinitely. It can moreover be realized for all known types of vibration dampers for vehicles, including single-tube and two-tube shock dampers and dampers having a hydro-pneumatic spring on one or on both the damping valves providing in the piston.

The actuating device of the regulating member may operate mechanically or with actuation by pressurized medium.

The variation of the contact pressure may occur automatically as a function of one or more control quantities, particularly dynamic driving quantities determined from the instantaneous driving conditions. While various parameters, such as driving speed, transverse acceleration, longitudinal acceleration, state of load, yawing angular velocity etc., for example, may participate individually or in combination as the determining control quantity.

The variation of the contact pressure may likewise be caused by the driver himself in order to permit a sports driving performance by hardening the shock dampers, for example.

The regulating member may, for example, be constructed in the manner of a cupped spring which may cooperate with a piston. In this arrangement, the cupped spring is braced against the piston on its concave side in its circumferential region.

In a preferred embodiment, the regulating member has a rubber elastic part which is formed as a hollow element. The interior space of this element is connectable to a pressure source. In another embodiment a piston rod can be provided with a feed channel to supply the pressurized medium. The rubber elastic part can be disposed on a bracing element which is slidably disposed on the piston rod and which is retained on a press piston. The press piston, bracing element and rubber elastic part are guided in a cylinder space. The pressurized medium is provided through the feed channel into this cylinder space.

The rubber elastic constitution of the regulating member ensures a stressing of the valve closure element surface area, which is a substantial advantage particularly when the valve closure element is formed by a plurality of spring washers arranged mutually coaxially and exhibiting different external diameters. The rubber elastic material also permits a lightweight construction of the regulating member. Further, the rubber elastic material reacts very rapidly with diminishing contact pressure due to its self-resilience as it returns to its original configuration in a short period of time. A sensitive reaction of the valve closure element is achieved by this means.

Advantageous embodiments are possible for stressing the valve closure element by the regulating member, and favorable structural measures for the arbitrary variation of the valve closure pressure at one or at both damping valves of the piston of a vibration damper as discussed in the description of the invention.

Further objects, features, and advantages of the present invention will become more apparent from the following description when taken with the accompanying drawings which show, for purposes of illustration only, an embodiment/several embodiments in accordance with the present invention.

DETAILED DESCRIPTION OF THE DRAWINGS

Figure 1:
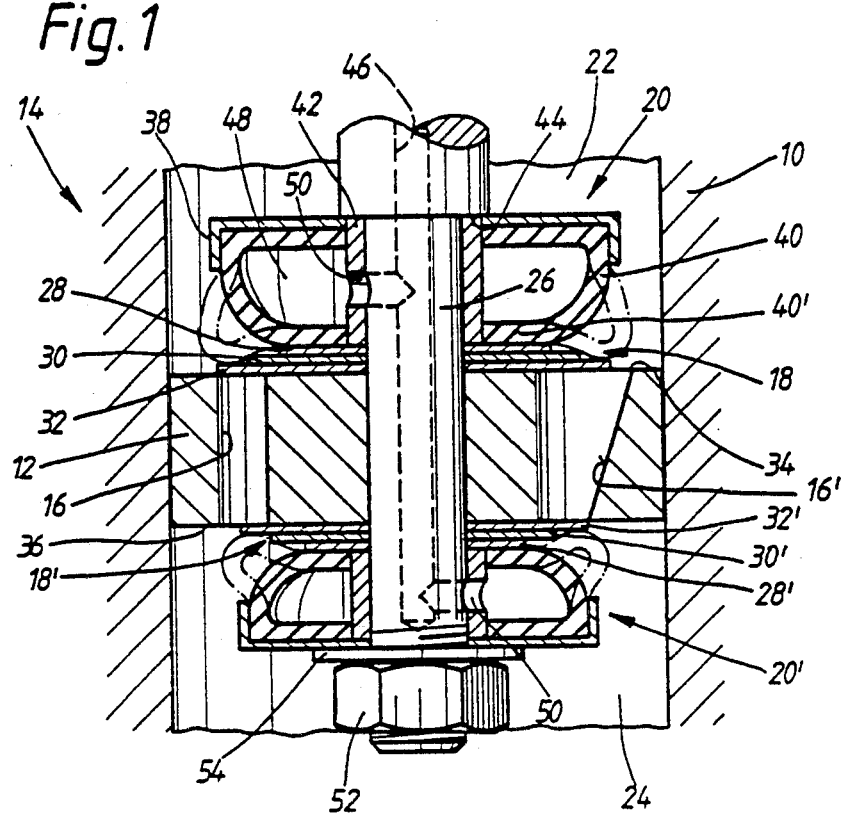
FIG. 1 is a longitudinal cross-sectional view of an embodiment of a shock damper, in which the flow resistance of each of the damping valves arranged in the piston is variable by a separate regulating member.

FIG. 1 shows a vibration damper constructed as a single-tube shock damper 14 having a piston 12 guided in a cylinder 10 and dividing it into two cylinder chambers 22 and 24.

For both the traction phase and the compression phase, the piston 12 of the shock damper 14 is equipped with a damping valve formed by a flowable medium passage channel 16 or 16' and a valve closure element 18 or 18'. The flow resistance of the valve closure element is variable within wide limits arbitrarily, and preferably infinitely independent of the pressure instantaneously prevailing in the corresponding cylinder chamber 22 or 24. This flow resistance is varied by means of a regulating member 20 or 20' to permit the damping to be adapted optimally to the driving conditions of a vehicle.

The valve closure element 18 or 18' of the damping valves is formed in known manner, by a plurality of spring washers 28, 30, 32, or 28', 30' or 32' arranged on a piston rod 26 penetrating the piston 12. These spring washers exhibit different external diameters. The spring washer 32 or 32' with the greatest external diameter covers the exit orifice of the flowable medium passage channel 16 or 16' which leads out of the piston end face 34 or 36 which this spring washer abuts.

The regulating member 20 or 20' respectively associated with the valve closure elements 18 or 18' exhibits the same construction for both damping valves. The regulating member is equipped with a bracing element 38 of cup-like configuration opening towards the piston 12. It is also equipped with a hollow ring 40 of rubber elastic material, preferably rubber, which is arranged between the bracing element 38 and valve closure element 18 or 18'. This hollow ring 40 engages partially into the bracing element 38 and rests, preferably, against the spring washers 28 or 28' exhibiting the smallest external diameter when only the basic damping is required to be effective at the damping valve. The hollow ring 40 rests against the spring washers by a wall part 40' remote from the bracing element. The spring washers 28–32 are attached to the piston 12 by means of a distance bushing 42 which is arranged on the piston rod 26 and is braced against the spring washer 28 on one end and against a bracing shoulder 44 of the piston rod 26 on the other end. This distance bushing 42 penetrates the rubber elastic hollow ring 40 and the bracing element 38.

To enable the flow resistance of the damping valves to be varied by means of the regulating member 20 and/or 20', and thereby to adapt the damping optimally to driving conditions, a pressurized medium, which may be liquid or gaseous, must be fed to the hollow ring 40. For this purpose, a feed channel 46 extends within the piston rod 26. From this feed channel, a connecting channel 50 penetrates the distance bushing 42 and extends away radially to the interior space 48 of each hollow ring 40.

As FIG. 1 shows, instead of being braced against a bracing shoulder of the piston rod, the regulating member 20' is braced against a bracing washer 54 fitted on the piston rod and retained by means of a screwthreaded nut 52.

An increase in the flow resistance at the damping valves, or a desired variation of the characteristic curve of the vibration damper in the sense of a reinforcement of the damping, for example, of a progressive pattern of the damper curve, becomes possible if pressurized medium is fed through the channels 46, 50 to the hollow rings 40 and the hollow rings are thereby expanded. This is indicated by chain-dotted lines in FIG. 1. At the same time, the hollow rings are applied progressively under pressure to the spring washers 30, 32, or 30', 32' in the radial direction.

The increase of the internal pressure of the hollow rings 40 may occur automatically by means of one or more control quantities, particularly dynamic driving quantities, determined from the driving conditions. Furthermore, it is possible to vary the internal pressure of the hollow rings arbitrarily by manual control in order to influence the corresponding driving performance of the vehicle.

The basic damping of the damping valves may be dimensional equally or differently. This can be achieved, for example, by a different number of spring washers and/or by different thicknesses of the spring washers. The hollow rings 40 and the regulating members 20 or 20' cooperating with them may also be dimensioned differently. However, these should be dimensioned so that they at least partially cover the valve closure element 18 or 18' formed by the spring washers associated with them.

An advantageous variant construction could also be achieved by equipping only one of the two damping valves of the piston 12 with the regulating member 20 or 20' and giving the other damping valve a desired basic damping. Another advantageous embodiment could be achieved by expanding the regulating members 20 or 20' to different degrees through mutually separate channels in order to generate different flow resistances.

Figure 2:
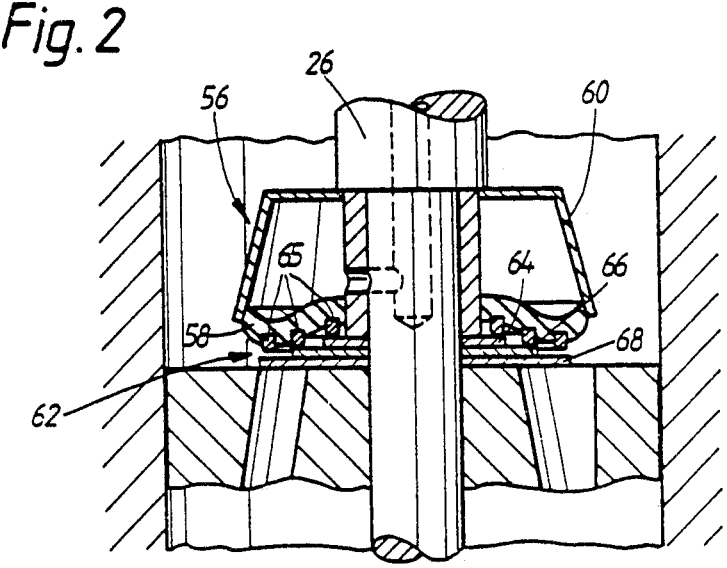
FIG. 2 is a longitudinal cross-sectional view of another embodiment of the regulating member associated with the damping valve, which is partially pressed against a valve closure element.

FIG. 2 shows a variant construction of a regulating member 56. In this embodiment, the rubber elastic part of the regulating member forms a membrane 58 which closes the cup-shaped bracing element 60, braced against the piston rod 26, on its open side facing the valve closure element 62.

In this embodiment the outside of membrane 58 is equipped with wear-resistant bracing elements 65, preferably annular and arranged mutually concentrically. Each of the bracing elements become braced against one of the spring washers upon an increase in the pressure in the interior of the regulating member. This occurs due to the increase in pressure forcing the membrane to bulge out towards the spring washers 64, 66, 68 of the valve closure element 62. This construction is characterized by particular abrasion resistance of the rubber elastic part of the regulating member 56.

Figure 3:
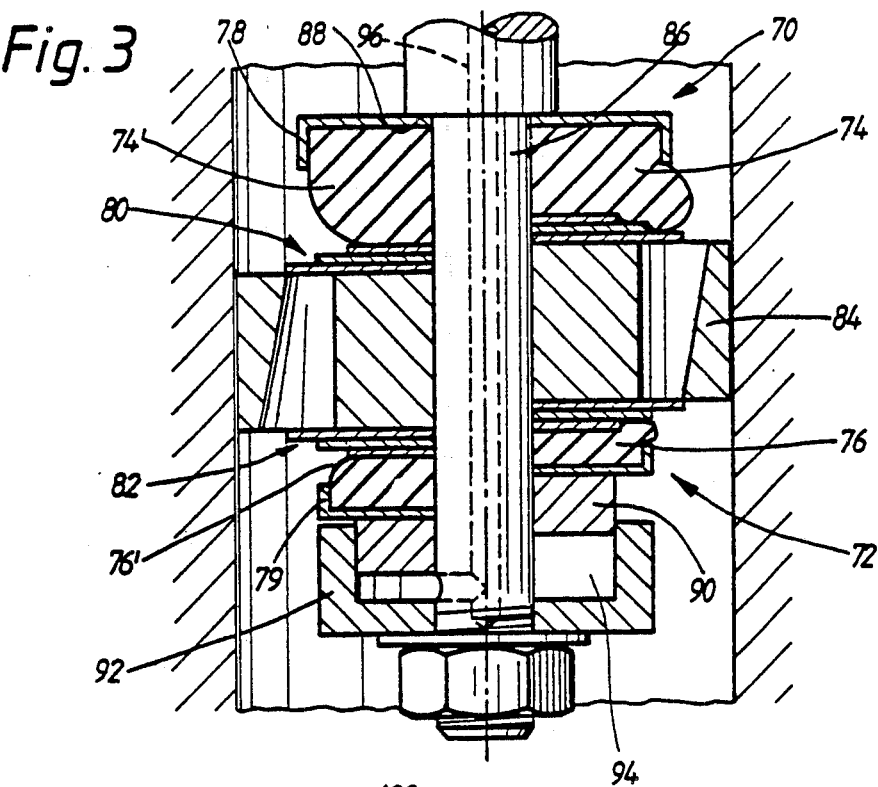
FIG. 3 is a longitudinal cross-sectional view of another embodiment of a shock damper, in which the flow resistance of each of the piston damping valves is variable by a separate regulating member, the regulating members being shown in the initial state on the left hand side of the Figure and in the final state on the right hand side of the Figure.

In the exemplary embodiment illustrated in FIG. 3, the damping valves provided in the piston for the traction phase and compression phase are each capable of being influenced by a regulating member 70 or 72, in order to increase their flow resistance.

Unlike the construction of FIG. 1, the rubber elastic part of the two regulating members 70 and 72 forms a buffer-like insert 74 or 76, preferably made of rubber, which is inserted partially into a cup-shaped bracing element 78 or 79 and protrudes out of the bracing element with a portion 74' or 76' exhibiting a convex surface. This portion abuts the spring washer exhibiting the smallest external diameter of the valve closure element 80 or 82 when the insert 74 or 76 is not compressed, and the damping valves accordingly exhibit their basic damping (see left-hand half of FIG. 3). The valve closure element 80, 82 can include three spring washers for example.

Analogous to the construction of FIG. 1, the regulating members 70 and 72 are arranged on a piston rod 86 penetrating the piston 84 of the shock damper, upon which the piston 84 is provided axially adjustably.

Whereas the bracing element 78 of the regulating member 70 is braced against a bracing shoulder 88 of the piston rod 86, the bracing element 79 is connected at its end face remote from the insert 76 to a press piston 90 which is slidably guided in a cylinder 92 braced against the piston rod 86. The cylinder space 94 of the cylinder 92 is connectable to a pressurized medium source through a feed channel 96 extending within the piston rod.

If it is required to vary the basic damping of the damper valves in the sense of a harder damping, pressurized medium is fed to the cylinder space 94. This forces the press piston 90 to slide towards the piston 84 and the rubber elastic insert 76 thereby becomes compressed. The rubber elastic insert 76 becomes wider in the radial direction across the valve element 82 or its spring washers. In conformity with the effective contact pressure, the spring washers are correspondingly hardened. The axial adjustment of the piston 84 which ten occurs also causes the rubber elastic insert 74 of the regulating member 70 to be compressed and likewise displaced outwards in the radial direction. This likewise results in a hardening of the spring washers of the valve closure element 80 (see right-hand half of FIG. 3).

Both the construction according to FIG. 1 and the embodiment last explained, present a simple possibility to vary the basic damping of both damping valves of the piston 12 or 84 equally or to differnt degrees. An equal variation of the damper curve for both damping valves is obtained if both the regulating members and also both the valve closure elements to be stressed by the regulating members are of identical construction. However, FIG. 3 shows a construction in which the regulating member 72 exhibits smaller dimensions of diameter and height than the regulating member 70. Therefore, when the maximum contact pressure is generated by the press piston 90, the radial region across which the insert 76 of the regulating member 72 is displaced radially is smaller than that of the insert 74 of the regulating member 70. In addition, the spring washers of the two valve closure elements 80 and 82 may also be dimensioned differently.

Figure 4:
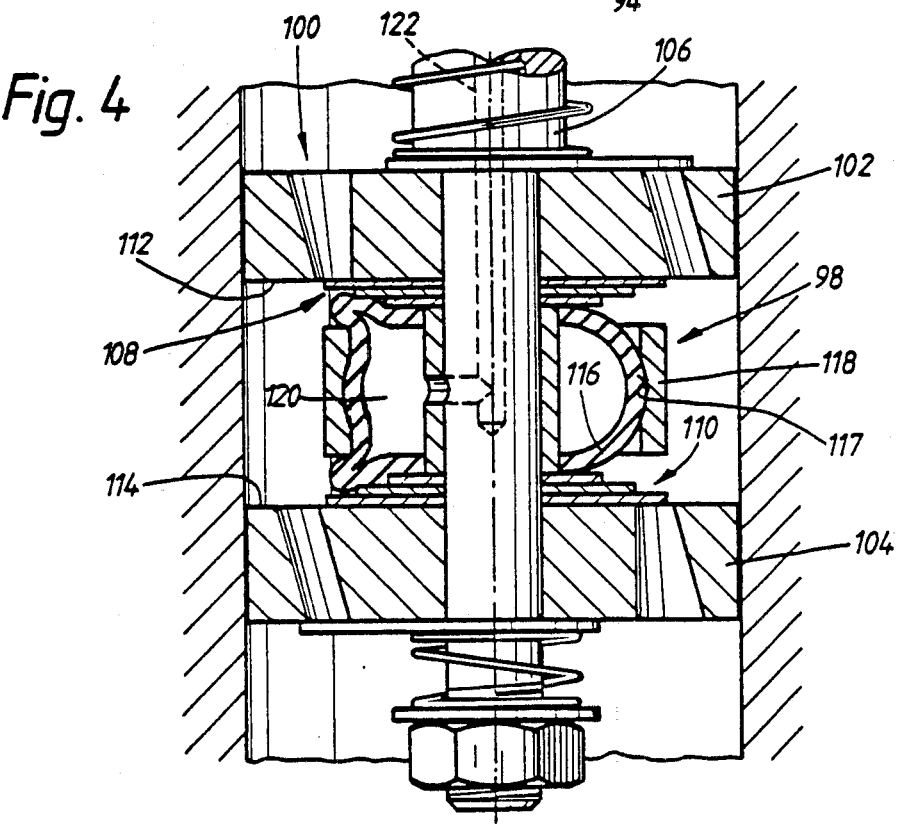
FIG. 4 is a longitudinal cross-sectional view of another embodiment of a shock damper, in which the flow resistance of both piston damping valves is variable by a common regulating member, the regulating member being shown in the initial state on the right hand side of the Figure and in the final state on the left hand side of the Figure.

The construction illustrated in FIG. 4 requires only one regulating member 98 for the valve closure elements of both damping valves of a shock damper. For this purpose the piston 100 is divided into two partial pistons 102 and 104 which are arranged at a mutual axial interval on a piston rod 106.

The valve closure elements 108 and 110 are located on the mutually facing end faces 112 and 114 of the two partial pistons 102, 104, and the regulating member 98 is arranged on the piston rod 106 between the two valve elements 108 and 110. In the present construction, the regulating member forms a resilient deformable annular hollow element which is preferably made of rubber. For the basic damping of the damping valve this hollow element exhibits a cross-section with a circular segment-shaped circumferential surface, for example. This example is shown in the right-hand half of FIG. 4. On its external circumference, this hollow element 116 is equipped with an armour in the form of a hollow cylindrical band 118. This cylindrical band is preferably formed by a metal ring having an axial length which is shorter than that of the hollow element 116. The band 118 is fitted on the hollow element so that the latter exhibits equal overlap at both of its end faces. The hollow element 116, by its external circumferential surface, also positively engages partially into an annular groove-like depression 117 on the inner circumference of the band 118, whereby the two parts 116, 118 are advantageously mutually axially secured.

The interior space 120 of the hollow element 116 is connectable to a pressurized medium source through a connecting channel 122 arranged in the piston rod 106. If an increase in the flow resistance of both the damping valves is desired, or if this is required to be increased as a function of the speed for example, then hydropneumatic pressurized medium for example is fed to the hollow element 116. This causes the hollow element to expand, in accordance with the left-hand half of the drawing in FIG. 4, and to spread outwards both towards the valve closure elements 108, 110 and also radially to the valve closure elements, thereby stressing the corresponding spring washers of the valve closure elements.

Figure 5:
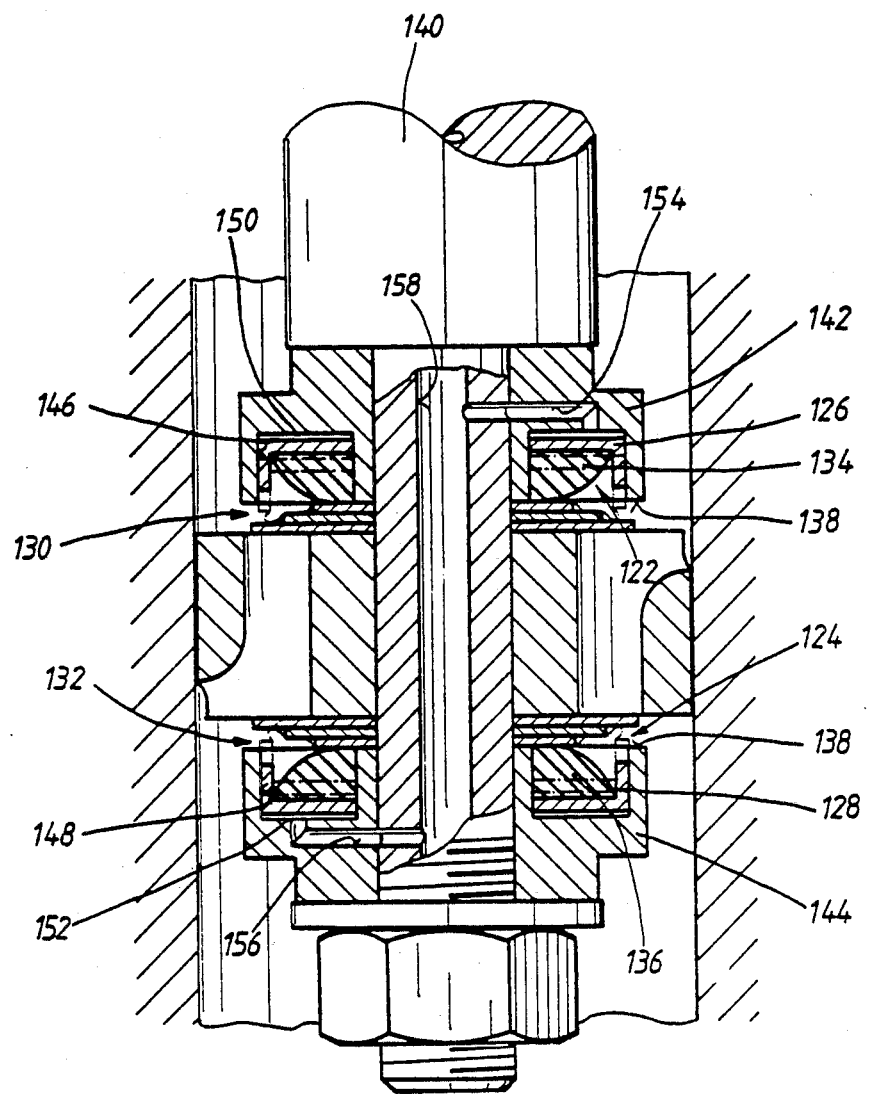
FIG. 5 is a longitudinal cross-sectional view of another embodiment of a shock damper, in which the valve closure elements of both piston damping valves are simultaneously stressable by a pressurized medium-actuated regulating member.

The construction of a shock damper to be adopted preferably according to FIG. 5 differs from that according to FIG. 3 in that both regulating members 122 and 124 can be applied under pressure to the valve closure elements 130 and 132 by a separate press piston 126 or 128.

However, in this embodiment the bracing element of the regulating members 122 and 124, which contains the resiliently deformable insert 134 or 136, has the advantage of simultaneously forming one of the press pistons 126 or 128. For this purpose, the annular bracing elements 126, 128 are each guided fluid-tightly with axial mobility in an annular groove 146 or 148 machined into the end face 138 of a guide element 142 or 144 braced against the piston rod 140.

The pressurized medium required to press the deformable insert 134 or 136 against the valve closure elements 130, 132 is fed through a feed channel 158 arranged centrally in the piston rod 140. From this feed channel 158, the pressurized medium is fed into the annular presure spaces 150, 152 formed by the annular grooves 146, 148 and the press pistons 126, 128 through a channel connection 154 or 156. The deformable inserts 134, 136 are shown in a pressed position by dotted lines in FIG. 5.

In the exemplary embodiment illustrated the actuation of the press pistons is simultaneous. The press pistons can also be modulated mutually independently through feed channels arranged separately in the piston rod 140.

In the illustrated exemplary embodiments of vibration dampers according to the invention, the actuating device for the regulating member or members operates by the use of a pressurized medium.

The actuating device to generate the contact pressure may equally well operate mechanically, for example through a linkage guided particularly in the piston rod. The modulation of the regulating members may also occur through mutually independently actuable linkage parts.

Further, the damping force at the damping valves may advantageously be made operative in different degrees by different resiliences of the regulating members and/or by different configurations of their constituent containing the rubber elastic part.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A vibration damper for vehicles comprising:
   a cylinder containing a flowable medium;
   a piston slidably disposed in the cylinder, the piston creating a first chamber and a second chamber in the cylinder;
   a piston rod attached to the piston;
   a valve member including a flowable medium channel in the piston, the channel having an opening into each chamber of the cylinder, and a valve closure means for covering at least one opening of the channel in the piston, the valve closure means exerting a force against the channel; and
   an elastic regulating means for regulating the valve closure means force against the channel with a variable force independent of pressure conditions prevailing in the cylinder, said elastic regulating means includes an elastic contact member and means for progressively expanding said elastic contact member radially across said valve closure means onto at least a portion of said valve closure means covering said at least one opening, thereby increasing the contact area between said elastic contact member and said valve closure means.

2. A vibration damper as in claim 1, wherein the regulating means presses against the closure means by means of a pressurized medium feedable from a pressure source.

3. A vibration damper as in claim 2, including an actuating means through said piston rod for feeding the pressurized medium to said regulating means.

4. A vibration damper as in claim 3, wherein said actuating means includes a feed channel in the piston rod leading to the regulating member.

5. A vibration damper as in claim 2, wherein the elastic contact member includes a hollow expandable element having an interior space connectable to the said pressure source.

6. A vibration damper as in claim 5, wherein the valve closure means includes at least one spring washer.

7. A vibration damper as in claim 2, including:
   a bracing element slidably disposed on the piston rod, the elastic contact member being disposed between said bracing element and the valve closure means;
   a press piston means slidably disposed on the piston rod abutting the bracing element for applying pressure to the bracing element and elastic contact member; and
   a cylinder member braced on the piston rod, the cylinder member containing the pressed piston means, wherein the pressurized medium is fed into the cylinder member.

8. A vibration damper as in claim 7, wherein a first valve closure means abuts a first face of the piston and a second valve closure means abuts a second face of the piston, both of the valve closure means being variably forced against the piston channel; and including a first regulating means associated with the first valve closure means and a second regulating means associated with the second valve closure means, the first regulating means being braced against the piston rod and the second regulating means being slidably disposed on the piston rod, wherein the second regulating means is movable by means of the press piston means.

9. A vibration damper as in claim 2, wherein the regulating member includes a cup-shaped bracing element braced against the piston rod and the elastic contact member closes off the cup-shaped bracing member forming an interior space, the interior space being connectable to the pressure source.

10. A vibration damper as in claim 9, wherein the valve closure means includes a plurality of spring washers stacked concentrically on said piston rod, the spring washers having a varying diameters increasing in size from the elastic contact member to the channel opening on the piston.

11. A vibration damper as in claim 10, wherein the elastic contact member includes a plurality of concentric bracing rings, each bracing ring corresponding to a spring washer, the bracing rings being progressively pressable against the spring washers under influence of the pressurized medium.

12. A vibration damper as in claim 2, including:
   an annular guide member disposed on and braced against the piston rod;
   an annular groove provided in the guide member, wherein the regulating means are slidably disposed in the annular groove and the regulating means is pressable against the valve closure means by a pressurized medium fed into the annular groove.

13. A vibration damper as in claim 1, wherein the elastic contact member is rubber.

14. A vibration damper as in claim 1, wherein a first valve closure means abuts a first face of the piston and the a second valve closure means abuts a second face of the piston, both of the valve closure means being variably forced against the piston channel; and including a first regulating means associated with the first valve closure means and a second regulating means associated with the second valve closure means, wherein the first regulating means has an elastic contact member larger than the second regulating means elastic contact member.

15. A vibration damper as in claim 1, including two regulating means, each regulating means being connected to a separate channel to provide variable pressure to each regulating means.

16. A vibration damper as in claim 1, wherein said elastic contact member extends radially beyond said means for progressively expanding said elastic contact member.

* * * * *